C. WEILER.
CAPS FOR SPINNING SPINDLES.
No. 185,807. Patented Dec. 26, 1876.
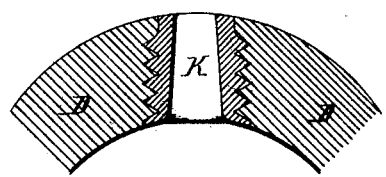
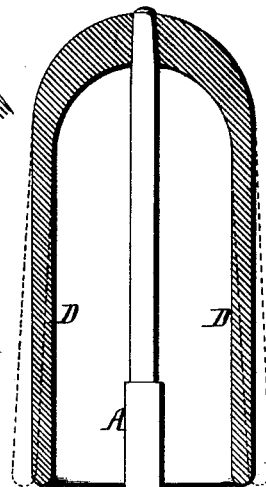
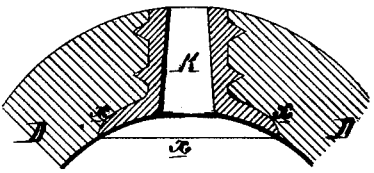
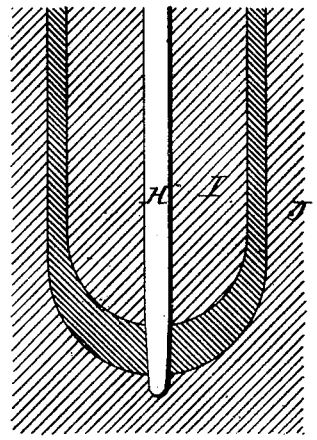
Witnesses
Harry Howson Jr
Harry Smith
Charles Weiler
by his Attorneys
Howson and Son

UNITED STATES PATENT OFFICE.

CHARLES WEILER, OF LANDENBERG, ASSIGNOR TO JOHN LANDENBERGER AND GEORGE W. LANDENBERGER, OF PHILADELPHIA, PENNSYLVANIA.

IMPROVEMENT IN CAPS FOR SPINNING-SPINDLES.

Specification forming part of Letters Patent No. 185,807, dated December 26, 1876; application filed April 3, 1876.

*To all whom it may concern:*

Be it known that I, CHARLES WEILER, of Landenberg, Chester county, Pennsylvania, have invented certain Improvements in Caps for Spinning-Spindles, of which the following is a specification:

My invention relates to the manufacture of caps used in connection with stationary spindles, on which bobbins are caused to revolve in spinning-machines; and my invention consists in making the caps of glass, so that they will present a smooth surface for the yarn to bear against, will not attract moisture so readily as a metal surface, and will not require the constant cleansing which a cap of polished metal demands. My invention further consists in providing the glass caps with metal thimbles, in the manner described hereafter.

In the accompanying drawing, Figure 1 represents a spindle of the class to which my invention relates, the cap of the spindle being in section.

A represents the spindle; B, the pulley for supporting the bobbin, and D the cap, which is made of glass instead of metal, and which may be of cylindrical form, as shown by plain lines in Fig. 1, or of a tapering form, as shown by dotted lines, the cap terminating in the usual rounded top.

The cap is made in the same manner as other articles of pressed glass are made—that is say, by the use of a mold of the desired external shape of the cap, in conjunction with a plunger for imparting the proper conformation to the interior.

The hole in the top of the cap may be made by first boring and then grinding the hole to the desired taper, or the hole may be made during the process of molding the glass, in the manner shown in Fig. 2, in which I represents a portion of the plunger, and J part of the mold, the plunger having a central sliding rod, H, and the end of the latter forming, while the glass is in a plastic condition, the desired taper hole, which must necessarily be concentric with the cap.

Instead of forming the hole for the spindle directly in the glass, it may be made in a thimble, K, secured to the glass during the process of molding, the same as shown in Fig. 3, the central position of the plunger in the mold being insured by a pin or plunger during the operation of pressing the glass.

In Fig. 3 the thimble has a series of grooves for insuring its retention in place; but I prefer to make the metal thimble in the manner shown in Fig. 4—that is, with a flange, *x*, concave on the under side, for resisting the blows on the spindle in adjusting the cap to its place. The projections on the thimbles may be made of different forms, providing they are sufficient, when embedded in the glass, to retain the said thimble in its place.

I claim as my invention—

1. The glass cap, having an orifice adapted to the spindle, as set forth.

2. The combination of the spindle, the glass cap, and the thimble embedded in the same, and adapted to the spindle, all substantially as set forth.

In testimony whereof I have signed my name to this specification in the presence of two subscribing witnesses.

CHARLES WEILER.

Witnesses:
HARRY HOWSON, Jr.,
HARRY SMITH.